Patented Sept. 1, 1931

1,821,324

UNITED STATES PATENT OFFICE

KOLOMAN RÓKA, OF KONSTANZ, BADEN, GERMANY, ASSIGNOR, BY MESNE ASSIGNMENTS, TO THE FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

METHOD OF PRODUCING ACETONE

No Drawing. Application filed July 17, 1925, Serial No. 44,367, and in Germany July 21, 1924.

In so far as acetone is not produced by fermentation, the production on a commercial scale has hitherto been effected almost exclusively by decomposition of calcium acetate or pyrolignite of lime. It has also been proposed to convert acetic acid into acetone by means of catalysts. Proposals have also been made to convert acetylene into acetone. The last named processes have, as far as the inventor knows, not been adopted in practice.

The inventor has set himself the task of converting acetaldehyde into acetone. Attempts to obtain this result by the oxidation of the acetaldehyde by means of oxygen or oxygen-containing gases, such as air, in which for instance the mixture of acetaldehyde, oxygen (or air) and water vapour were conducted at a raised temperature over contact substances, did not lead to satisfactory results. It was found, however, that the production of acetone may be successfully carried out in a straightforward reaction by bringing acetaldehyde into reaction with water vapour the mixture being heated for instance to temperatures between 250 and 660° C., the reaction taking place according to the following equation: $2CH_3CHO + H_2O = CH_3COCH_3 + CO_2 + 2H_2$. The yield of acetone is increased by carrying out the reaction in presence of catalysts, thereby increasing the rate of reaction.

As catalysts substances having the capacity of causing the water vapor to react with acetaldehyde are used, during which reaction acetone is produced. Of catalysts increasing the rate of reaction the following may be named, viz., oxygen compounds of iron, of manganese, copper and the like, for instance ferric oxide, manganic hydroxide, copper hydrate, copper carbonate and the like. In general it has been found of advantage to use such catalysts together with other substances, for instance in the form of iron-containing minerals or of substances or mixtures containing iron, for instance oxygen compounds of iron or the like preferably in a very porous or spongy form. Finally it has been found that it is possible to increase the effectiveness of the catalysts by additional substances which may be called promoters and regarded as auxiliary substances having the effect of assisting reaction, more particularly with respect of increasing the conversion. Such reaction-assisting auxiliary substances are among others for instance calcium carbonate, magnesium oxide and the like. When using such catalyst combinations, for instance ferric oxide and calcium carbonate, it has been found of advantage to bring the compounds into contact with each other as completely as possible, for instance by preparing grains containing both the components or by using one component as carrier for the other. Experiments have shown that the process may be influenced catalytically relatively easily. The rate of reaction will already be increased, for instance if the reaction vessels consist of catalytic material or contain catalytically acting substances or auxiliary substances or both. With otherwise similar conditions better results might for instance be obtained in iron tubes than in quartz tubes.

Preferably excess quantities of water vapour are used.

Examples

1. An iron tube of 34 mm. internal diameter, charged with granulated Breunnerit, which is an iron containing magnesite (Tschermak, Lehrbuch der Mineralogie, 1915, page 541), was heated over a length of 620 mm. up to 500°–550°. After this temperature was reached, a mixture of 195 grms. acetaldehyde and 2000 grms. of water was passed in 7 hours through the tube. The escaping vapours were condensed. The condensate contained 65 grms. acetone, besides unconsumed acetaldehyde and acetic acid. The yield (calculated with respect to the acetaldehyde used) thus amounted to 50.6% of the theoretical yield.

2. A quartz tube of 30 mm. internal diameter was charged with rusty iron filings or the like impregnated with calcium carbonate (for instance by a dilute calcium acetate solution, into which the filings or the like had been laid, being concentrated by evaporation, while being agitated, whereupon the filings were annealed) and heated to a length of 600 mm. up to 470°–475°. Within 8 hours 165 grms. of acetaldehyde and 1500 grms. of water vapour were passed through. The condensate obtained from the escaping vapours contained 99 grms. of acetone. The yield (calculated with respect to the acetaldehyde used) thus amounted to 91% of the theoretical yield.

Further experiments have shown that it is also possible to convert into acetone acetaldehyde mixed with other substances, conversible into acetone, such as ethyl alcohol, acetic acid, acetic ether and the like, and that the conversion of acetaldehyde or of mixtures of the kind referred to above can be successfully carried out, even when substances not taking part in the reaction are present, such as methyl alcohol and the like. Based on this knowledge, mixtures containing acetaldehyde, such as occasionally occur in the art, may be treated for obtaining acetone, without it being necessary previously to separate these mixtures into their constituent parts. Such mixtures among others are obtained in the production of acetaldehyde from ethyl alcohol whereby, products result containing acetaldehyde, alcohol and acetic acid. In a preferred way of carrying out the process, while not attempting to obtain a theoretically high yield, large quantities of acetaldehyde are treated and the reaction mixture thus obtained, after the removal of the main product (acetone) which besides unchanged acetaldehyde contains other constituents, such as acetic acid and water, is further treated in the same apparatus for obtaining acetone, fresh acetaldehyde being preferably added. By treating mixtures containing, besides acetaldehyde and in some cases other substances conversible to acetone, constituents that cannot be converted to acetone, such as methyl alcohol or substances which are capable of forming such constituents, such as methyl acetate, products may for instance be obtained, which represent mixtures of acetone and methyl alcohol, which without being separated into their constituent parts may be utilized, for instance as solvents.

At the end of certain working periods, for instance after 8 days, the catalysts show a diminution of their effectiveness. Experiments have shown, that such catalysts having a reduced effectiveness may be regenerated by treating them with water vapour at increased temperatures, for instance temperatures between 450° and 600°.

The regenerating process may be carried out in various ways, for instance by cutting off the supply of acetaldehyde and, while maintaining the reaction temperature, say about 500° to about 550°, blowing water vapour through the contact vessel. After continuing the treatment with water vapour for about 2 to 3 hours the regenerating process is generally complete, so that the supply of acetaldehyde can again be started.

The regeneration of the catalysts may also be carried out by treating them with oxygen of oxygen-containing gas mixtures, such as air, at high temperatures, the procedure being for instance such that, when the rate of reaction is sinking, the conversion process is interrupted and for instance air is passed through at temperatures lying between about 450° and 600°, preferably maintaining the reaction temperature used during the production of acetone during the regenerating process as well.

It has been found that the regeneration is assisted by using water vapour combined with oxygen or gases containing oxygen, such as air, the acetaldehyde supply being cut off and water vapour alone with the addition of air, for instance, being passed through the contact pipe at increased temperatures for instance temperatures between 450 and 600°. When oxygen is used alone or in combination, the completion of the regeneration may be recognized by the fact that oxygen is no more absorbed or no longer absorbed in appreciable quantities.

With advantage the procedure may be such that the activation of the catalysts with water vapour or oxygen or oxygen-containing gases or both is carried out before any exhaustion or appreciable weakening of the catalysts has been observed. By this means constantly high yields of ketones are obtained.

The life of the catalysts may also be prolonged by the introduction without interrupting the ketonizing process of small quantities of air together with the mixture of water vapour and acetaldehyde into the contact vessel, a portion of the hydrogen formed as a by-product during the reaction being burnt, so that besides the activation of the catalysts there is an internal heating of the reaction space.

The hydrogen liberated during the reaction may be recovered from the waste gases of the reaction and be used for carrying out the process of acetone production, for instance by using it for the external heating or for combined internal and external heating of the reaction zone.

Claims:

1. A method for making acetone which consists in reacting acetaldehyde with water vapor at temperatures from 250° C. to 660° C. in the presence of a catalyst comprising a basic, inorganic, oxygen-containing compound of a heavy metal.

2. A method for making acetone which consists in reacting acetaldehyde with water vapor at temperatures from 250° C. to 660° C. in the presence of a catalyst comprising a basic, inorganic, oxygen compound of a heavy metal of the 7th and 8th groups of the periodic system.

3. A method for making acetone which consists in reacting acetaldehyde with water vapor at temperatures from 250° C. to 660° C. in the presence of a catalyst comprising a basic inorganic oxygen compound of iron.

4. A method for making acetone which consists in reacting vapor mixtures, consisting mainly of acetaldehyde vapor, with water vapor at temperatures from 250° C. to 660° C. in the presence of a catalyst, comprising a basic, inorganic, oxygen-containing compound of a heavy metal.

5. A method for making acetone which consists in reacting vapor mixtures of a acetaldehyde and other aliphatic substances, with at least two C-atoms bound to each other, with water vapor at temperatures from 250° C. to 660° C. in the presence of a catalyst, comprising a basic, inorganic, oxygen-containing compound of a heavy metal.

6. A method for making acetone which consists in conducting alternately a mixture of acetaldehyde vapor with water vapor and oxidizing gases over a catalytically acting basic, inorganic, oxygen compound of a heavy metal at temperatures from 250° C. to 660° C.

7. A method for making acetone which consists in conducting a mixture of acetaldehyde and water vapor over a catalytically acting basic, inorganic, oxygen compound of a heavy metal at temperatures from 250° C. to 660° C. and intermittently stopping the acetaldehyde supply while maintaining the heat supply.

8. A method for making acetone which consists in reacting acetaldehyde with an excess of water vapor at temperatures from 250° C. to 660° C. in presence of a catalyst comprising a basic, inorganic, oxygen-containing compound of a heavy metal.

In testimony whereof I affix my signature.

KOLOMAN RÓKA.